(12) United States Patent
Choi et al.

(10) Patent No.: US 10,903,975 B2
(45) Date of Patent: *Jan. 26, 2021

(54) APPARATUS AND METHOD FOR PERFORMING OPERATION BEING SECURE AGAINST SIDE CHANNEL ATTACK

(71) Applicant: SAMSUNG SDS CO., LTD., Seoul (KR)

(72) Inventors: Kyu-Young Choi, Seoul (KR); Duk-Jae Moon, Seoul (KR); Hyo-Jin Yoon, Seoul (KR); Ji-Hoon Cho, Seoul (KR)

(73) Assignee: SAMSUNG SDS CO., LTD., Seoul (KR)

( * ) Notice: Subject to any disclaimer, the term of this patent is extended or adjusted under 35 U.S.C. 154(b) by 173 days.

This patent is subject to a terminal disclaimer.

(21) Appl. No.: 16/101,711

(22) Filed: Aug. 13, 2018

(65) Prior Publication Data

US 2019/0327073 A1    Oct. 24, 2019

(30) Foreign Application Priority Data

Apr. 19, 2018   (KR) ......................... 10-2018-0045584

(51) Int. Cl.
*H04L 9/00*   (2006.01)
*H04L 9/08*   (2006.01)

(52) U.S. Cl.
CPC ............ *H04L 9/002* (2013.01); *H04L 9/0819* (2013.01); *H04L 9/0869* (2013.01)

(58) Field of Classification Search
CPC ........ G02F 1/139; G02F 1/167; G02F 1/0147; G02F 1/172; G02F 1/1334; G02F 1/132; G02F 1/0102; B60J 3/04

See application file for complete search history.

(56) References Cited

U.S. PATENT DOCUMENTS 9,680,647 B2 *   6/2017   Fischer ................. H04L 9/0869
2013/0016830 A1   1/2013   Ebeid
2013/0016834 A1   1/2013   Gebotys
2014/0169553 A1   6/2014   Chen et al.

(Continued)

OTHER PUBLICATIONS

Search Report dated Jan. 7, 2019, issued by the International Searching Authority in counterpart International Patent Application No. PCT/KR2018/009994 (PCT/ISA/210).

*Primary Examiner* — Mohammed Waliullah
(74) *Attorney, Agent, or Firm* — Sughrue Mion, PLLC

(57) ABSTRACT

An apparatus and method for performing an operation which are secure against side-channel attack are provided. According to one embodiment of the present disclosure, the apparatus includes a first extractor configured to extract one or more first parameter candidate values corresponding to a seed value from a first parameter candidate value set, a first outputter configured to output a first output values using the extracted first parameter candidate values, a second extractor configured to extract one or more second parameter candidate values corresponding to the seed value from a second parameter candidate value set, and a second outputter configured to output a second output value using the extracted second parameter candidate values wherein the second output value is capable of being generated using the first output value.

10 Claims, 6 Drawing Sheets

(56) References Cited

U.S. PATENT DOCUMENTS

2015/0288520 A1* 10/2015 Jacobson ............ H04L 9/3066
                                                   380/28
2016/0277180 A1   9/2016 Wang et al.
2017/0033923 A1   2/2017 Melzani

* cited by examiner

APPARATUS AND METHOD FOR PERFORMING OPERATION BEING SECURE AGAINST SIDE CHANNEL ATTACK

CROSS-REFERENCE TO RELATED APPLICATION(S)

This application claims the benefit under 35 USC § 119(a) of Korean Patent Application No. 10-2018-0045584, filed on Apr. 19, 2018, in the Korean Intellectual Property Office, the entire disclosure of which is incorporated herein by reference for all purposes.

BACKGROUND

1. Field

The following description relates to a technology for side-channel attack prevention.

2. Description of Related Art

As Internet of Things (IoT) devices evolve, there is a growing risk of side-channel attacks that gain important information by exploiting physical information leaked from devices during a key exchange for encryption, mathematical computations for an encryption, a digital signature, etc.

A side-channel attack is an attack that obtains secret information using a leakage of side-channel information (e.g., power consumption, the amount of electromagnetic radiation, algorithm execution time, etc.) for computations performed during an operation of an algorithm for key exchange, encryption, digital signature, etc.

A power analysis attack, which is a form of side-channel attack, is known as the most powerful side-channel attack, and equipment for power analysis attacks is also known as a very effective attack means because of high probability of realization with low cost. Thus, the power analysis attack is a field in which the most research is being currently conducted. A method of such a power analysis attack largely includes simple power analysis (SPA), differential power analysis (DPA), collision attack (CA), and the like.

Methods that have been proposed so far to prevent side-channel attack have problems in that they require a large amount of computation and thus cause performance degradation and they are methods for protecting against only some side-channel attacks. A method secure against all of the side-channel attacks has not been proposed yet. In addition, there has been proposed no method secure against collision attacks.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

The disclosed embodiments are intended to provide an apparatus and method for preventing exposure of important information by a side-channel attack.

In one general aspect, there is provided an apparatus for performing an operation, including a first extractor configured to extract one or more first parameter candidate values corresponding to a seed value from a first parameter candidate value set, a first outputter configured to output a first output values using the extracted first parameter candidate values, a second extractor configured to extract one or more second parameter candidate values corresponding to the seed value from a second parameter candidate value set, and a second outputter configured to output a second output value using the extracted second parameter candidate values, wherein the second output value is capable of being generated using the first output value.

The second output value may have a value equal to a value obtained through an operation using the first output value as an exponent or a multiplier.

The second parameter candidate value set may include a plurality of second parameter candidate values equal to values obtained through an operation using each of the first parameter candidate values included in the first parameter candidate value set as an exponent or a multiplier.

The extracted second parameter candidate values may have values equal to values obtained through an operation using each of the extracted first parameter candidate values as an exponent or a multiplier.

The seed value may be formed by an arbitrary bit string, the first extractor may extract one or more first parameter candidate values corresponding to the bit string, and the second extractor may extract one or more second parameter candidate values corresponding to the bit string.

The first extractor may extract the one or more first parameter candidate values on the basis of a bit value of each bit included in the bit string and a position of each bit in the bit string and the second extractor may extract the one or more second parameter candidate values on the basis of a bit value of each bit included in the bit string and the position of each bit in the bit string.

The apparatus may further include an encryptor configured to perform at least one of digital signature generation, encryption, and encryption key generation using the first output value and the second output value.

In another general aspect, there is provided a method of performing an operation, including extracting one or more first parameter candidate values corresponding to a seed value from a first parameter candidate value set, outputting a first output values using the extracted first parameter candidate values, extracting one or more second parameter candidate values corresponding to the seed value from a second parameter candidate value set, and outputting a second output value using the extracted second parameter candidate values, wherein the second output value is capable of being generated using the first output value.

The second output value may have a value equal to a value obtained through an operation using the first output value as an exponent or a multiplier.

The second parameter candidate value set may include a plurality of second parameter candidate values equal to values obtained through an operation using each of the first parameter candidate values included in the first parameter candidate value set as an exponent or a multiplier.

The extracted second parameter candidate values may have values equal to values obtained through an operation using each of the extracted first parameter candidate values as an exponent or a multiplier.

The seed value may be formed by an arbitrary bit string, the extracting of the first parameter candidate values may include extracting one or more first parameter candidate values corresponding to the bit string, and the extracting of the second parameter candidate values may include extracting one or more second parameter candidate values corresponding to the bit string.

The extracting of the first parameter candidate values may include extracting the one or more first parameter candidate values on the basis of a bit value of each bit included in the bit string and a position of each bit in the bit string and the extracting of the second parameter candidate values may include extracting the one or more second parameter candidate values on the basis of a bit value of each bit included in the bit string and the position of each bit in the bit string.

The method may further include performing at least one of digital signature generation, encryption, and encryption key generation using the first output value and the second output value.

Other features and aspects will be apparent from the following detailed description, the drawings, and the claims.

Figure 1:
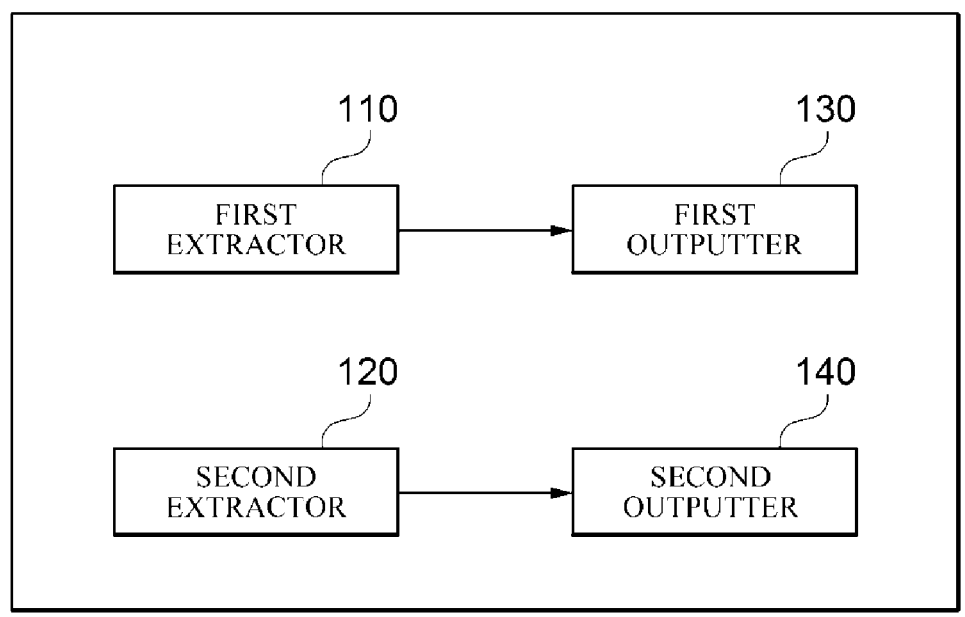
FIG. 1 is a configuration diagram illustrating an apparatus for performing an operation according to one embodiment of the present disclosure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art.

Descriptions of well-known functions and constructions may be omitted for increased clarity and conciseness. Also, terms described in below are selected by considering functions in the embodiment and meanings may vary depending on, for example, a user or operator's intentions or customs. Therefore, definitions of the terms should be made on the basis of the overall context. The terminology used in the detailed description is provided only to describe embodiments of the present disclosure and not for purposes of limitation. Unless the context clearly indicates otherwise, the singular forms include the plural forms. It should be understood that the terms "comprises" or "includes" specify some features, numbers, steps, operations, elements, and/or combinations thereof when used herein, but do not preclude the presence or possibility of one or more other features, numbers, steps, operations, elements, and/or combinations thereof in addition to the description.

FIG. 1 is a configuration diagram illustrating an apparatus for performing an operation according to one embodiment of the present disclosure.

Referring to FIG. 1, the apparatus 100 for performing an operation according to one embodiment of the present disclosure includes a first extractor 110, a second extractor 120, a first outputter 130, and a second outputter 140.

The first extractor 110 extracts one or more first parameter candidate values that correspond to a seed value from a set of first parameter candidate values (hereinafter referred to as a first parameter candidate value set).

In this case, the seed value may be an arbitrary value represented by a bit string of a predetermined length. For example, the seed value may be an arbitrary value generated within a predetermined range. In another example, the seed value may be a value obtained by converting a user's ID or an arbitrarily generated value into a bit string of a predetermined length using, for example, a hash function.

In the embodiment of the present disclosure, the seed value may be a value generated using various methods in addition to the above example, and need not be necessarily generated using a particular method.

The first parameter candidate value set may include a plurality of first parameter candidate values. In this case, each of the first parameter candidate values may be a pre-generated arbitrary value or a value selected from a predetermined range.

According to one embodiment of the present disclosure, the first extractor 110 may extract one or more first parameter candidate values corresponding to the bit string of the seed value.

In addition, according to one embodiment of the present disclosure, the first extractor 110 may extract one or more first parameter candidate values on the basis of a bit value of each bit included in the bit string of the seed value and the position of each bit in the bit string.

The second extractor 120 extracts one or more second parameter candidate values corresponding to the seed value from a set of second parameter candidate values (hereinafter referred to as a second parameter candidate value set).

In this case, the second parameter candidate value set may include a plurality of second parameter candidate values. Each of the second parameter candidate values may have the same value as a value obtained through an operation using each of the first parameter candidate values included in the first parameter candidate value set as an exponent or a multiplier.

For example, each of the second parameter candidate values may have the same value obtained through an exponentiation operation using the first parameter candidate values as an exponent as shown in Equation 1 below.

$$r = g^k \quad (1)$$

Here, k denotes a first parameter candidate value, r denotes a second parameter candidate value, g denotes a generator of a multiplicative group having p as an order, and p denotes an arbitrary prime number. Hereinafter, k, r, g, and p represent the same as defined above.

In another example, each of the second parameter candidate values may have the same value as a value obtained through a scalar multiplication operation using the first parameter candidate values as an multiplier as shown in Equation 2 below.

$$r = k \cdot P \quad (2)$$

Here, P represents a generator of an additive group (e.g., an elliptic curve group) having p as an order, and hereinafter represents the same.

According to one embodiment of the present disclosure, the second extractor 120 may extract one or more second parameter candidate values corresponding to a bit string of the seed value.

In addition, according to one embodiment of the present disclosure, the second extractor 120 may extract one or more second parameter candidate values on the basis of a bit value of each of the bits included in the bit string of the seed value and a position of each of the bits in the bit string.

Meanwhile, according to one embodiment of the present disclosure, each of the second parameter candidate values extracted by the second extractor 120 may have a value equal to a value generated using each of the first parameter candidate values extracted by the first extractor 110 as an exponent or a multiplier.

The first outputter 130 generates a first output value using one or more first parameter candidate values extracted by the first extractor 110 and the second outputter 140 generates a second output value using one or more second parameter candidate values extracted by the second extractor 120.

In this case, the second output value may have a value equal to a value obtained through an operation using the first output value as an exponent or a multiplier.

For example, when n (where n is an integer greater than 1) first parameter candidate values and n second parameter candidate values are extracted, the first outputter 130 may generate a first output value by adding the n extracted first parameter candidate values to each other as shown in Equation 3 below.

$$a = k_{e1} + k_{e2} + \ldots + k_{en} \quad (3)$$

In addition, the second outputter 140 may generate the second output value by adding or multiplying the n extracted second parameter candidate values with each other.

For example, when the second parameter candidate value set includes the second parameter candidate values that can be generated through an operation using each of the first parameter candidate values included in the first parameter candidate value set as an exponent, the second outputter 140 may generate the second output value by multiplying the n extracted second parameter candidate values as shown in Equation 4 below.

$$b = r_{e1} \times r_{e2} \times \ldots \times r_{en} \quad (4)$$

In this case, Equation 4 can be expressed as Equation 5 below.

$$b = g^{(k_{e1} + k_{e2} + \ldots + k_{en})} = g^a \quad (5)$$

That is, referring to Equation 5, it can be seen that the second output value output by the second outputter 140 is equal to a value obtained through an operation using the first output value as an exponent.

Meanwhile, when the second parameter candidate value set includes second parameter candidate values that can be generated through an operation using each of the first parameter candidate values included in the first parameter candidate value set as a multiplier, the second outputter 140 may generate the second output value by adding the n extracted second parameter candidate values to each other as shown in Equation 6 below.

$$b = r_{e1} + r_{e2} + \ldots + r_{en} \quad (6)$$

In this case, Equation 6 can be expressed as Equation 7 below.

$$b = (k_{e1} + k_{e2} + \ldots + k_{en}) \cdot P = a \cdot P \quad (7)$$

That is, referring to Equation 7, it can be seen that the second output value output by the second outputter 140 is equal to a value obtained through an operation using the first output value as a multiplier.

Figure 2:
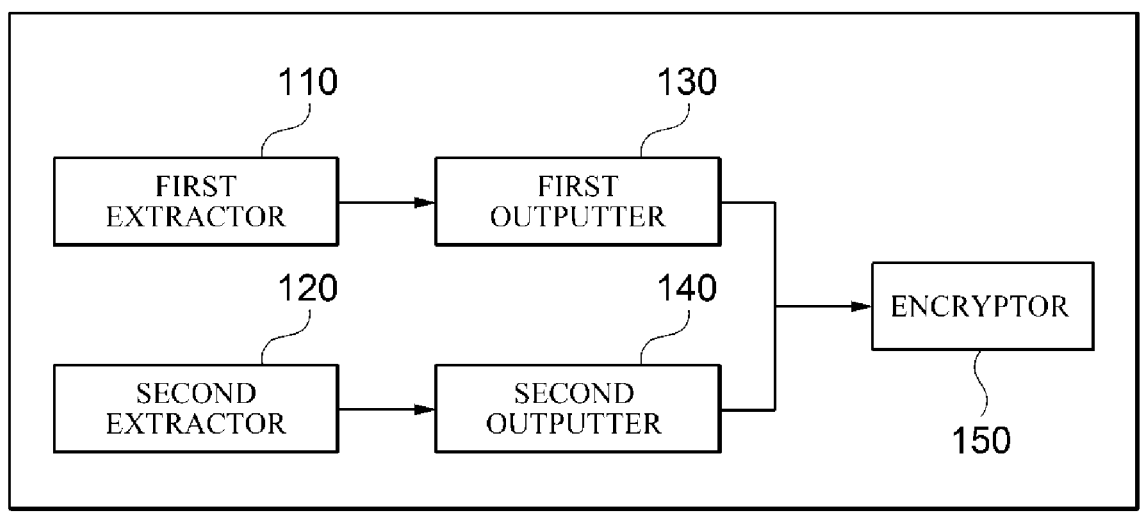
FIG. 2 is a configuration diagram illustrating an operation for performing an operation according to an additional embodiment of the present disclosure.

FIG. 2 is a configuration diagram illustrating an operation for performing an operation according to an additional embodiment of the present disclosure.

Referring to FIG. 2, the apparatus 100 for performing an operation may further include an encryptor 150.

The encryptor 150 performs at least one of encryption key generation, digital signature generation, and encryption using a first output value and a second output value.

For example, the encryptor 150 may generate an encryption key using a key exchange algorithm, such as a Diffie-Hellman key exchange algorithm, which requires an exponentiation operation.

Specifically, an illustrative encryption key generation procedure in accordance with a Diffie-Hellman key exchange algorithm is as follows:
1) A chooses a random integer $X_1$, where $X_1 \in [1, p-1]$, and then generates $Y_1 = g^{X_1} \mod p$
2) B chooses a random integer $X_2$, where $X_2 \in [1, p-1]$, and then generates $Y_2 = g^{X_2} \mod p$
3) A and B exchange $Y_1$ and $Y_2$
4) A computes $S_k = Y_2^{X_1} \mod p = g^{X_1 X_2} \mod p$ to generate an encryption key $S_k$
5) B computes $S_k = Y_1^{X_2} \mod p = g^{X_1 X_2} \mod p$ to generate an encryption key $S_k$ In this case, the encryptor 150 may use the first output value as $X_1$ or $X_2$ and use the second output value as $g^{X_1}$ or $g^{X_2}$. That is, the encryptor 150 may generate $Y_1$ or $Y_2$ without a direct operation for $g^{X_1}$ or $g^{X_2}$.

In another example, the encryptor 150 may generate an encryption key according to a key exchange algorithm, such as an elliptic curve Diffie-Hellman (ECDH) key exchange algorithm, which requires a scalar multiplication operation.

Specifically, an illustrative encryption key generation procedure in accordance with an ECDH key exchange algorithm is as follows:
1) A chooses a random integer $X_a$, where $X_a \in [1, n-1]$, and then generates $Y_a = X_a \cdot P$
2) B chooses a random integer $X_b$, where $X_b \in [1, n-1]$, and then generates $Y_b = X_b \cdot P$
3) A and B exchange $Y_a$ and $Y_b$
4) A computes $S_k = X_a \cdot Y_b = X_a \cdot (X_b \cdot P)$ to generate an encryption key $S_k$
5) B computes $S_k = X_b \cdot Y_a = X_b \cdot (X_a \cdot P)$ to generate an encryption key $S_k$ In this case, the encryptor 150 may use the first output value as $X_a$ or $X_b$ and use the second output value as $Y_a$ or $Y_b$. That is, the encryptor 150 may generate $Y_a$ or $Y_b$ without a direct operation for $X_a \cdot P$ or $X_b \cdot P$.

In another example, the encryptor 150 may perform encryption using an encryption algorithm, such as an ElGamal encryption algorithm, which requires an exponentiation operation.

Specifically, an illustrative encryption procedure in accordance with the ElGamal encryption algorithm is as follows:

1) A random integer t is chosen, where t∈[1,p−1]
2) $C_1 = g^t \mod p$ is computed
3) $C_2 = (pk^t \mod p) \cdot M$ is computed (where pk is a public key and M is a message to be encrypted)
4) Encrypted text ($C_1$, $C_2$) is output In this case, the encryptor 150 may use the first output value as t and use the second output value as $g^t$. That is, the encryptor 150 may generate the encrypted text $C_1$ without a direct operation for $g^t$.

In another example, the encryptor 150 may perform encryption using an encryption algorithm, such as an elliptic curve cryptography (ECC) algorithm, which requires a scalar multiplication operation.

Specifically, an illustrative encryption procedure in accordance with the ECC algorithm is as follows:

1) A random integer t is chosen, where t∈[1,n−1]
2) $C_1 = t \cdot P$ is computed
3) $C_2 = t \cdot Q + M$ is computed (where Q is a public key and M is a message to be encrypted)
4) Encrypted text ($C_1$, $C_2$) is output In this case, the encryptor 150 may use the first output value as t and use the second output value as $C_1$. That is, the encryptor 150 may generate the encrypted text $C_1$ without a direct operation for t·P.

In another example, the encryptor 150 may generate a digital signature using a digital signature algorithm (DSA) which requires an exponentiation operation.

Specifically, an illustrative digital signature generation procedure in accordance with DSA is as follows:

1) A random integer t is chosen, where t∈[1,q−1] (where, q is a prime divisor of p−1)
2) $R = (g^t \mod p) \mod q$ is computed
3) $S = t^{-1}(H(m) + CR) \mod q$ is computed (where C is a secret key, m is a message, and H( ) is a hash function)
4) Signature values (R, S) for a message are output In this case, the encryptor 150 may use the first output value as t and use the second output value as $g^t$. That is, the encryptor 150 may generate a signature value R without a direct operation for $g^t$.

In another example, the encryptor 150 may generate a digital signature using a digital signature algorithm, such as an elliptic curve digital signature algorithm (ECDSA), which requires a scalar multiplication operation.

Specifically, a digital signature generation procedure in accordance with the ECDSA is as follows:

1) A random integer t is selected, where t∈[1,n−1]
2) $t \cdot P = (x_1, y_1)$ is computed
3) $R = x_1 \mod n$ is computed
4) $S = t^{-1}(H(m) + CR) \mod n$ is computed (where C is a secret key, m is a message, and H( ) is a hash function)
5) Signature values (R, S) for a message are output In this case, the encryptor 150 may use the first output value as t and use the second output value as t·P. That is, the encryptor 150 may generate a digital value R without a direct operation for t·P.

Figure 3:
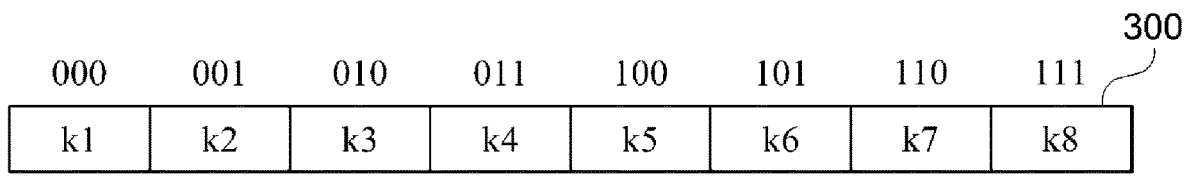
FIGS. 3 and 4 are diagrams for describing an example of an extraction of a first parameter candidate value and a second parameter candidate value according to a first embodiment of the present disclosure.
Figure 4:
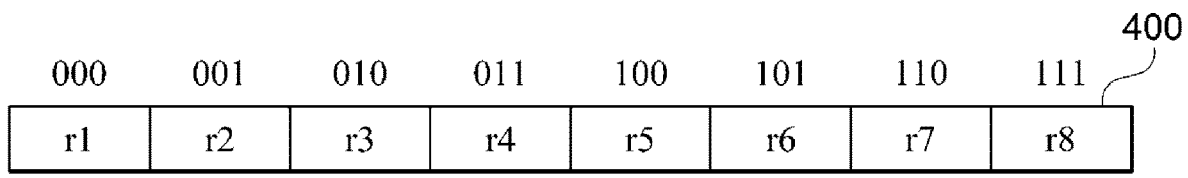

FIGS. 3 and 4 are diagrams for describing an example of an extraction of a first parameter candidate value and a second parameter candidate value according to a first embodiment of the present disclosure.

Meanwhile, in the example shown in FIGS. 3 and 4, it is assumed for convenience of description that a seed value has a length of 3 bits.

Referring to FIGS. 3 and 4, bit strings, which each have a length of 3 bits, stated above a first parameter candidate value set 300 and a second parameter candidate value set 400 represent index values that are assigned, respectively, to first parameter candidate values and second parameter candidate values. In this case, the index value may be represented by a bit string with the same length as the seed value. That is, in the example shown in FIGS. 3 and 4, as the length of the seed value is assumed to be 3 bits, the index value is represented as a bit string with a length of 3 bits. However, the length of the index value may vary according to the length of the seed value.

Meanwhile, the first parameter candidate value set 300 may include $2^n$ (where n is a length of a seed value) first parameter candidate values and the second parameter candidate value set 400 may include the same number of second parameter candidate values as the number of the first parameter candidate values included in the first parameter candidate value set 300. In the example shown in FIGS. 3 and 4, as the length of the seed value is assumed to be 3 bits, the first parameter candidate value set 300 includes 8 first parameter candidate values and the second parameter candidate value set 400 includes 8 second parameter candidate values.

Meanwhile, each of the second parameter candidate values included in the second parameter candidate value set 400 may be the same as a value generated through an operation using the first parameter candidate value having the same index value as the second parameter candidate value as an exponent or a multiplier.

Specifically, second parameter candidate value $r_1$ having an index value '000' may be the same as a value generated through an exponentiation operation that uses first parameter candidate value $k_1$ having an index value '000,' as shown in Equation 8 below.

$$r_1 = g^{k_1} \qquad (8)$$

In another example, second parameter candidate value $r_1$ having an index value '000' may be the same as a value generated through a scalar multiplication operation that uses first parameter candidate value $k_1$ which has an index value '000' as a multiplier, as shown in Equation 9 below.

$$r_1 = k_1 \cdot P \qquad (9)$$

Meanwhile, the first extractor 110 may compare an index value of each of the first parameter candidate values included in the first parameter candidate value set 300 to the seed value to extract a first parameter candidate value having an index value identical to the seed value. In this case, the first outputter 130 may output the extracted first parameter candidate value as a first output value.

In addition, the second extractor 120 may compare an index value of each of the second parameter candidate values included in the second parameter candidate value set 400 to the seed value to extract a second parameter candidate value having an index value identical to the seed value. In this case, the second outputter 140 may output the extracted second parameter candidate value as a second output value.

For example, when the seed value is '010,' the first extractor 110 may extract a first parameter candidate value $k_3$ that has an index value '010' from the first parameter candidate value set 300 and the second extractor 120 may extract a second parameter candidate value $r_3$ that has an index value '010' from the second parameter candidate value set 400.

In this case, the first outputter 130 may output the extracted $k_3$ as the first output value and the second outputter 140 may output the extracted $r_3$ as the second output value.

Specifically, in the example shown in FIGS. 3 and 4, when the seed value is '010,' the first output value is obtained as Equation 10 and the second output value is obtained as Equation 11 or 12.

$$a = k_3 \quad (10)$$

$$b = r_3 = g^{k_3} = g^a \quad (11)$$

$$b = r_3 = k_3 \cdot P = a \cdot P \quad (12)$$

That is, referring to Equations 11 and 12, it can be seen in the example shown in FIGS. 3 and 4 that the second output value output by the second outputter 140 is the same as a value generated through an operation using the first output value as an exponent or a multiplier.

Figure 5:
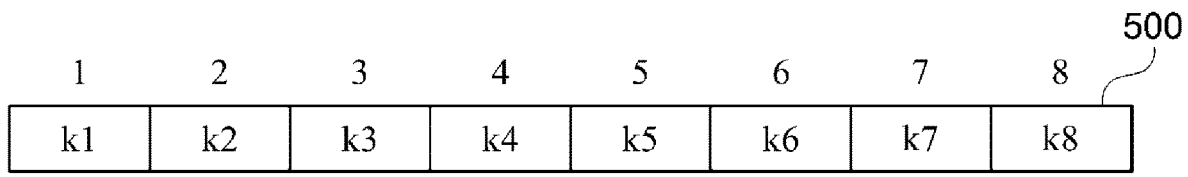
FIGS. 5 and 6 are diagrams for describing an example of an extraction of a first parameter candidate value and a second parameter candidate value according to a second embodiment of the present disclosure.
Figure 6:
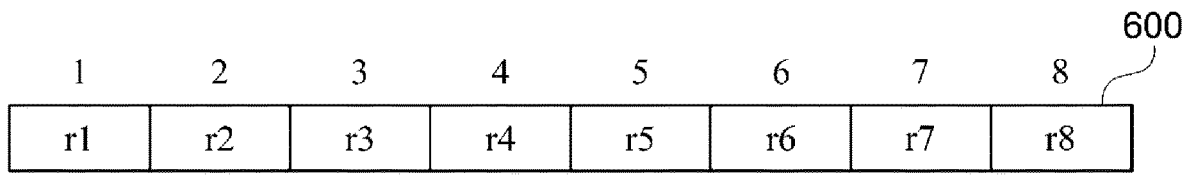

FIGS. 5 and 6 are diagrams for describing an example of an extraction of a first parameter candidate value and a second parameter candidate value according to a second embodiment of the present disclosure.

In the example shown in FIGS. 5 and 6, it is assumed for convenience of description that a seed value has a length of 8 bits.

Referring to FIGS. 5 and 6, numbers stated above a first parameter candidate value set 500 and a second parameter candidate value set 600 represent index values assigned to the first parameter candidate values and the second parameter candidate values, respectively.

The first parameter candidate value set 500 may include n (where n is a length of the seed value) first parameter candidate values and the second parameter candidate value set 600 may include the same number of second parameter candidate values as the number of the first parameter candidate values included in the first parameter candidate value set 500. In the example shown in FIGS. 5 and 6, it is assumed that the length of the seed value is 8 bits, and hence the first parameter candidate value set 500 includes 8 first parameter candidate values and the second parameter candidate value set 600 also includes 8 second parameter candidate values.

Meanwhile, each of the second parameter candidate values included in the second parameter candidate value set 600 may be the same as a value generated through an operation using the first parameter candidate value having the same index value as the second parameter candidate value as an exponent or a multiplier.

Specifically, a second parameter candidate value $r_2$ having an index value of '2' may be the same as a value obtained through an exponentiation operation using a first parameter candidate value $k_2$ having an index value of '2' as an exponent, as shown in Equation 13 below.

$$r_2 = g^{k_2} \quad (13)$$

In another example, a second parameter candidate value $r_2$ having an index value of '2' may be the same as a value obtained through a scalar multiplication operation using a first parameter candidate value $k_2$ having an index value of '2' as a multiplier, as shown in Equation 14.

$$r_2 k_2 \cdot P \quad (14)$$

The first extractor 110 may extract one or more first parameter candidate values having an index value corresponding to a position of a specific bit value in a bit string of the seed value from the first parameter candidate value set 500. In addition, the second extractor 120 may extract one or more second parameter candidate values corresponding to a position of a specific bit value in a bit string of the seed value.

For example, assuming that the seed value is '01100010,' a bit value of '1' is placed at the second, third and seventh positions in the seed value and a bit value of '0' is placed at the first, fourth, fifth, sixth, and eighth positions.

In this case, the first extractor 110 and the second extractor 120 may respectively extract the first parameter candidate values $\{k_2, k_3, k_7\}$ and the second parameter candidate values $\{r_2, r_3, r_7\}$ that have index values 2, 3, and 7, respectively, corresponding to the positions of the bit value of '1' in the seed value. In another example, the first extractor 110 and the second extractor 120 may respectively extract the first parameter candidate values $\{k_1, k_4, k_5, k_6, k_8\}$ and the second candidate values $\{r_1, r_4, r_5, r_6, r_8\}$ that have index values 1, 4, 5, 6, 8, respectively, corresponding to the positions of a bit value of '0' in the seed value.

In the above-described example, when the first parameter candidate values $\{k_2, k_3, k_7\}$ and the second parameter candidate values $\{r_2, r_3, r_7\}$ are extracted, the first outputter 130 may generate a first output value using, for example, Equation 15 below.

$$a = k_2 + k_3 + k_7 \quad (15)$$

In addition, when the second parameter candidate values $\{r_2, r_3, r_7\}$ are equal to values obtained through an operation using each of the first parameter candidate values $\{k_2, k_3, k_7\}$ as an exponent, the second outputter 140 may generate a second output value using, for example, Equation 16 below.

$$b = r_2 \times r_3 \times r_7 \quad (16)$$

In this case, Equation 16 can be expressed as Equation 17 below.

$$b = g^{(k_2+k_3+k_7)} = g^a \quad (17)$$

On the other hand, when the extracted second parameter candidate values $\{r_2, r_3, r_7\}$ are equal to values obtained through an operation using each of the first parameter candidate values $\{k_2, k_3, k_7\}$ as a multiplier, the second outputter 140 may generate a second output value using, for example, Equation 18 below.

$$b = r_2 + r_3 + r_7 \quad (18)$$

In this case, Equation 18 can be expressed as Equation 19 below.

$$b = (k_2 + k_3 + k_7) \cdot P = a \cdot P \quad (19)$$

That is, referring to Equations 16 to 19, it can be seen in the example shown in FIGS. 5 and 6 that the second output value output by the second outputter 140 is equal to a value derived through an operation using the first output value as an exponent or a multiplier.

Figure 7:
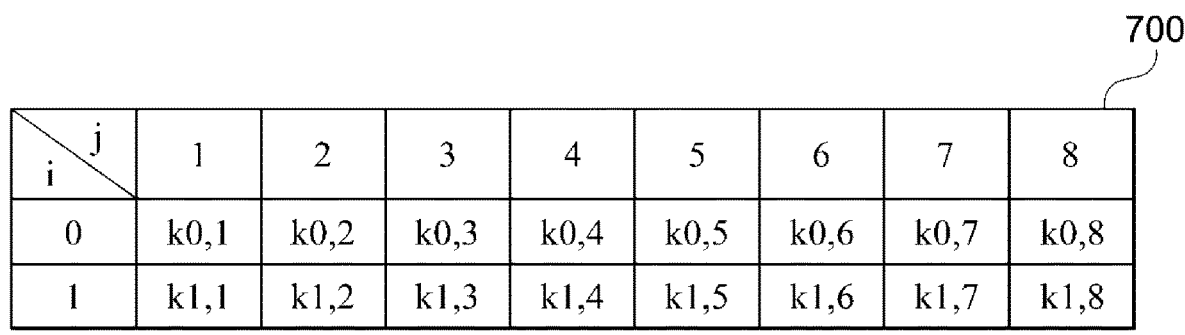
FIGS. 7 and 8 are diagrams for describing an example of an extraction of a first parameter candidate value and a second parameter candidate value according to a third embodiment of the present disclosure.
Figure 8:
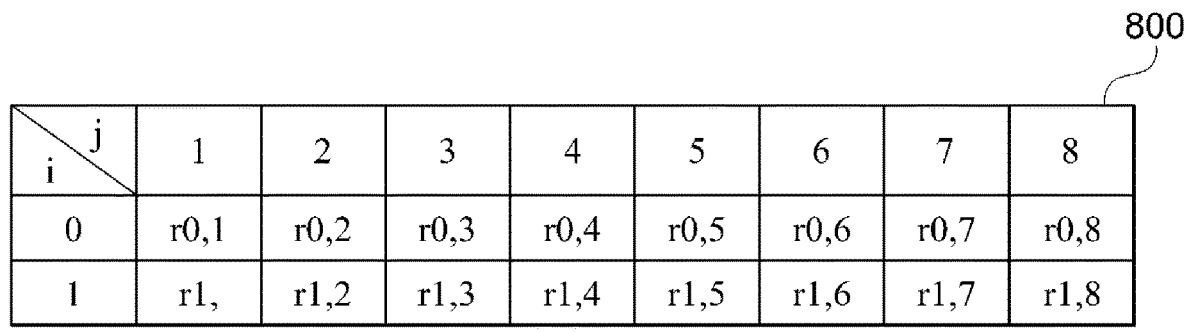

FIGS. 7 and 8 are diagrams for describing an example of an extraction of a first parameter candidate value and a second parameter candidate value according to a third embodiment of the present disclosure.

In the example shown in FIGS. 7 and 8, it is assumed for convenience of description that a seed value has a length of 8 its.

Referring to FIGS. 7 and 8, numbers stated above and on the left of a first parameter candidate value set 700 and a second parameter candidate value set 800 represent index values assigned to each of first parameter candidate values and second parameter candidate values. That is, each of the first parameter candidate values and the second parameter candidate values has index values (i, j) in the example shown in FIGS. 7 and 8. Here, an index value i corresponds to a bit value of each bit constituting a bit string of the seed value and an index value j corresponds to a position of each bit in the bit string of the seed value.

The first parameter candidate value set 700 may include 2×n (where n is a length of the seed value) first parameter candidate values and the second parameter candidate value set 800 may include the same number of second parameter candidate values as the number of the first parameter candidate values included in the first parameter candidate value set 700. In the shown example, as the length of the seed value is assumed to be 8 bits, the first parameter candidate value set 700 includes 2×8 first parameter candidate values and the second parameter candidate value set 800 also includes 2×8 second parameter candidate values.

Meanwhile, each of the second parameter candidate values included in the second parameter candidate value set 800 may be equal to a value generated through an operation using the first parameter candidate value having the same index value as the second parameter candidate value as an exponent or a multiplier.

Specifically, a second parameter candidate value $r_{i,j}$ may be the same as a value obtained through an exponentiation operation using, for example, a first parameter candidate value $k_{i,j}$ as an exponent, as shown in Equation 20 below.

$$r_{i,j}=g^{k_{i,j}} \qquad (20)$$

In another example, the second parameter candidate value may be the same as a value obtained through a scalar multiplication operation using a first parameter candidate value $k_{i,j}$ as a multiplier, as shown in Equation 21 below.

$$r_{i,j}=k_{i,j}\cdot P \qquad (21)$$

Meanwhile, the first extractor 110 may extract a plurality of first parameter candidate values having index values respectively corresponding to a bit value of each bit constituting a bit string of the seed value and a position of the bit in the bit string from the first parameter candidate value set 700. In addition, the second extractor 120 may extract a plurality of second parameter candidate values having index values respectively corresponding to a bit value of each bit constituting a bit string of the seed value and a position of the bit in the bit string from the second parameter candidate value set 800.

Specifically, for example, assuming that the seed value is '01100010,' a bit value of the first bit in the seed value is '0,' and thus the first extractor 110 and the second extractor 120 may respectively extract a first parameter candidate value $k_{0,1}$ and a second parameter candidate value $r_{0,1}$ that have index values of (0,1).

In addition, since a bit value of the second bit in the seed value is '1' the first extractor 110 and the second extractor 120 may respectively extract a first parameter candidate value $k_{1,2}$ and a second parameter candidate value $r_{1,2}$ that have index values of (1,2).

In the same way, the first extractor 110 may extract first parameter candidate values $\{k_{0,1}, k_{1,2}, k_{1,3}, k_{0,4}, k_{0,5}, k_{0,6}, k_{1,7}, k_{0,8}\}$ and the second extractor 120 may extract second parameter candidate values $\{r_{0,1}, r_{1,2}, r_{1,3}, r_{0,4}, r_{0,5}, r_{0,6}, r_{1,7}, r_{0,8}\}$.

In this case, the first outputter 130 may generate a first output value using, for example, Equation 22 below.

$$a=k_{0,1}+k_{1,2}+k_{1,3}+k_{0,4}+k_{0,5}+k_{0,6}+k_{1,7}+k_{0,8} \qquad (22)$$

When the second parameter candidate value included in the second parameter candidate value set 800 is the same as a value obtained through, for example, an exponentiation operation shown in Equation 20, the second outputter 140 may output a second output value using, for example, Equation 23 below.

$$b=r_{0,1}\times r_{1,2}\times r_{1,3}\times r_{0,4}\times r_{0,5}\times r_{0,6}\times r_{1,7}\times r_{0,8} \qquad (23)$$

In this case, Equation 23 can be expressed as Equation 24.

$$b=g^{(k_{0,1}+k_{1,2}+k_{1,3}+k_{0,4}+k_{0,5}+k_{0,6}+k_{1,7}+k_{0,8})}=g^a \qquad (24)$$

On the other hand, when the second parameter candidate value included in the second parameter candidate value set 800 is the same as a value obtained through, for example, a multiplication operation shown in Equation 21, the second outputter 140 may output a second output value using, for example, Equation 25 below.

$$b=r_{0,1}+r_{1,2}+r_{1,3}+r_{0,4}+r_{0,5}+r_{0,6}++r_{1,7}+r_{0,8} \qquad (25)$$

In this case, Equation 25 can be expressed as Equation 26 below.

$$b=(k_{0,1}+k_{1,2}+k_{1,3}+k_{0,4}+k_{0,5}+k_{0,6}+k_{1,7}+k_{0,8})\cdot P=a\cdot P \qquad (26)$$

That is, referring to Equations 23 to 26, it can be seen in the example shown in FIGS. 7 and 8 that the second output value output by the second outputter 140 has a value equal to the value obtained through an operation using the first output value as an exponent or a multiplier.

Figure 9:
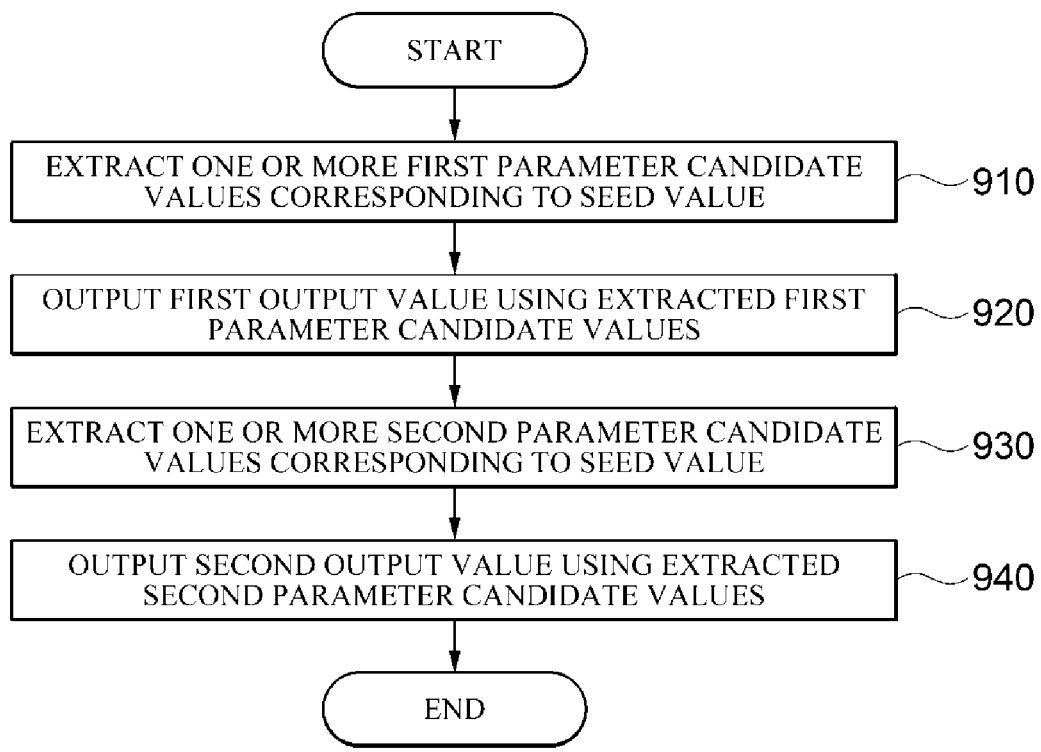
FIG. 9 is a flowchart illustrating a method of performing an operation according to one embodiment of the present disclosure.

FIG. 9 is a flowchart illustrating a method of performing an operation according to one embodiment of the present disclosure.

The method shown in FIG. 9 may be performed by the apparatus 100 illustrated in FIG. 1 or 2.

Referring to FIG. 9, the apparatus 100 extracts one or more first parameter candidate values corresponding to a seed value from a first parameter candidate value set (910).

In this case, according to one embodiment of the present disclosure, the apparatus 100 may extract one or more first parameter candidate values corresponding to a bit string of the seed value from the first parameter candidate value set.

In addition, according to one embodiment of the present disclosure, the apparatus 100 may extract one or more first parameter candidate values from the first parameter candidate value set on the basis of a bit value of each bit included in the bit string of the seed value and a position of each bit in the bit string.

Then, the apparatus 100 outputs a first output value using the one or more extracted first parameter candidate values (920).

In this case, according to one embodiment of the present disclosure, the apparatus 100 may generate the first output value by, for example, adding the one or more extracted first parameter candidate values to each other.

Then, the apparatus 100 extracts one or more second parameter candidate values corresponding to the seed value from a second parameter candidate value set (930).

In this case, according to one embodiment of the present disclosure, second parameter candidate values included in the second parameter candidate value set may have values equal to values obtained through an operation using each of the first parameter candidate values included in the first parameter candidate value set as an exponent or a multiplier.

In addition, according to one embodiment of the present disclosure, the apparatus 100 may extract one or more second parameter candidate values corresponding to the bit string of the seed value from the second parameter candidate value set.

Additionally, according to one embodiment of the present disclosure, the apparatus 100 may extract one or more second parameter candidate values from the second parameter candidate value set on the basis of a bit value of each bit included in the bit string of the seed value and a position of each bit in the bit string.

According to one embodiment of the present disclosure, the second parameter candidate values extracted from the second parameter candidate value set may each be the same as a value generated through an operation using each of the first parameter candidate values extracted in operation 910 as an exponent or a multiplier.

Then, the apparatus 100 outputs a second output value using the one or more extracted second parameter candidate values (940).

In this case, according to one embodiment of the present disclosure, the apparatus 100 may generate the second output value by, for example, adding or multiplying the one or more extracted second parameter candidate values with each other and the second output value may be the same as a value obtained through an operation using the first output value as an exponent or a multiplier.

While the flowchart shown in FIG. 9 illustrates the method as being performed in a plurality of operations, at least some of the operations may be performed in a different order, performed in combination with each other, omitted, performed in sub-operations, or performed with at least one operation that is not illustrated being added thereto.

Figure 10:
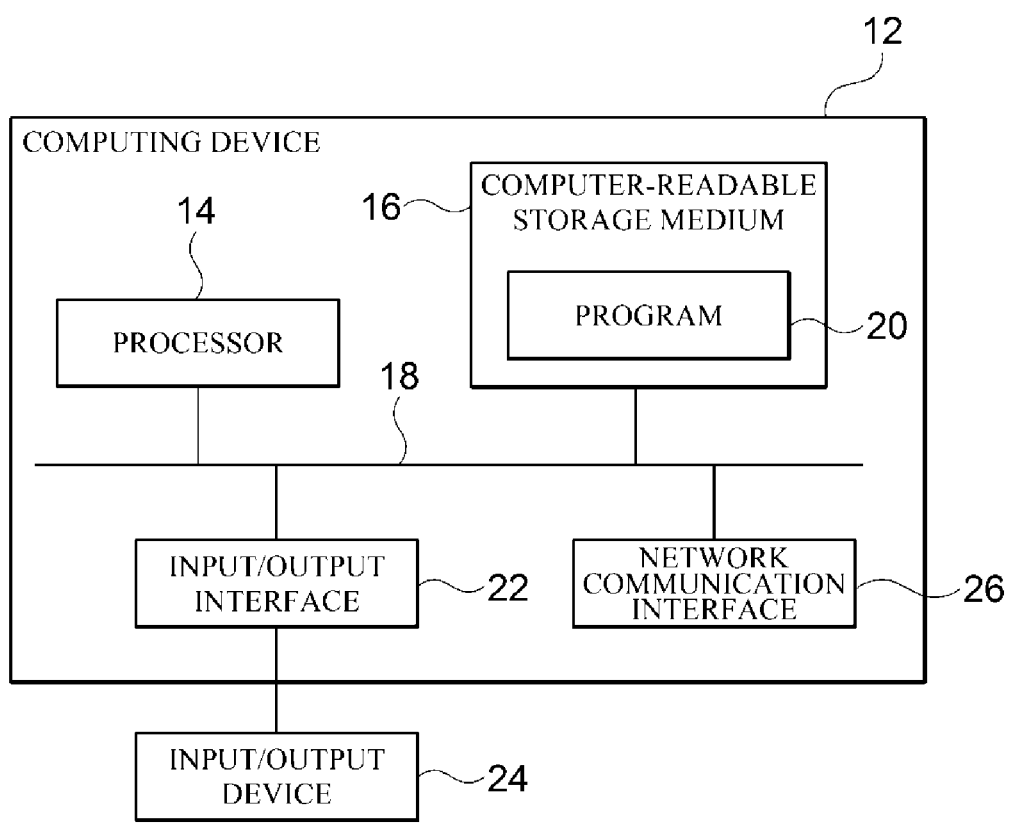
FIG. 10 is a block diagram for describing a computing environment including a computing device suitable to use in illustrative embodiments.

FIG. 10 is a block diagram for describing a computing environment including a computing device suitable to use in illustrative embodiments. In the illustrated embodiment, each of the components may have functions and capabilities different from those described hereinafter and additional components may be included in addition to the components described herein.

The illustrated computing environment 1 includes a computing device 12. In one embodiment, the computing device 12 may be one or more components included in an apparatus 100 for performing an operation.

The computing device 12 includes at least one processor 14, a computer-readable storage medium 16, and a communication bus 18. The processor 14 may enable the computing device 12 to operate according to the aforementioned exemplary embodiments. For example, the processor 14 may execute one or more programs stored in the computer-readable storage medium 16. The one or more programs may include one or more computer executable commands, and the computer executable commands may be configured to cause the computing device 12 to perform operations according to the illustrative embodiment when executed by the processor 14.

The computer-readable storage medium 16 is configured to store computer executable commands and program codes, program data and/or information in other suitable forms. The programs stored in the computer readable storage medium 16 may include a set of commands executable by the processor 14. In one embodiment, the computer readable storage medium 16 may be a memory (volatile memory, such as random access memory (RAM), non-volatile memory, or a combination thereof), one or more magnetic disk storage devices, optical disk storage devices, flash memory devices, storage media in other forms capable of being accessed by the computing device 12 and storing desired information, or a combination thereof.

The communication bus 18 interconnects various other components of the computing device 12 including the processor 14 and the computer readable storage medium 16.

The computing device 12 may include one or more input/output interfaces 22 for one or more input/output devices 24 and one or more network communication interfaces 26. The input/output interface 22 and the network communication interface 26 are connected to the communication bus 18. The input/output device 24 may be connected to other components of the computing device 12 through the input/output interface 22. The illustrative input/output device 24 may be a pointing device (a mouse, a track pad, or the like), a keyboard, a touch input device (a touch pad, a touch screen, or the like), an input device, such as a voice or sound input device, various types of sensor devices, and/or a photographing device, and/or an output device, such as a display device, a printer, a speaker, and/or a network card. The illustrative input/output device 24 which is one component constituting the computing device 12 may be included inside the computing device 12 or may be configured as a separate device from the computing device 12 and connected to the computing device 12.

According to the embodiments of the present disclosure, it is possible to generate a value equal to a value derived through an exponentiation operation or a scalar point multiplication operation using previously generated parameter candidate value sets and a simple operation secure against side-channel attack, thereby improving security against side-channel attack without degrading performance.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An apparatus for performing an operation, comprising a processor and a memory, the processor configured to:
   extract one or more first parameter candidate values corresponding to a seed value from a first parameter candidate value set;
   output a first output values using the extracted first parameter candidate values;
   extract one or more second parameter candidate values corresponding to the seed value from a second parameter candidate value set; and
   output a second output value using the extracted second parameter candidate values, wherein the second output value is capable of being generated using the first output value,
   wherein the first parameter candidate value set includes a plurality of first parameter candidate values, and the second parameter candidate value set includes a plurality of second parameter candidate values,
   the seed value is formed by an arbitrary bit string, and
   the processor is further configured to extract one or more first parameter candidate values corresponding to the bit string, to extract one or more second parameter candidate values corresponding to the bit string, to extract the one or more first parameter candidate values on the basis of a bit value of each bit included in the bit string and a position of each bit in the bit string, and to extract the one or more second parameter candidate values on the basis of a bit value of each bit included in the bit string and the position of each bit in the bit string.

2. The apparatus of claim 1, wherein the second output value has a value equal to a value obtained through an operation using the first output value as an exponent or a multiplier.

3. The apparatus of claim 1, wherein the second parameter candidate value set includes the plurality of second parameter candidate values equal to values obtained through an operation using each of the first parameter candidate values included in the first parameter candidate value set as an exponent or a multiplier.

4. The apparatus of claim 1, wherein the extracted second parameter candidate values have values equal to values obtained through an operation using each of the extracted first parameter candidate values as an exponent or a multiplier.

5. The apparatus of claim 1, further comprising an encryptor configured to perform at least one of digital signature generation, encryption, and encryption key generation using the first output value and the second output value.

6. A method of performing an operation, comprising:
   extracting one or more first parameter candidate values corresponding to a seed value from a first parameter candidate value set;
   outputting a first output values using the extracted first parameter candidate values;
   extracting one or more second parameter candidate values corresponding to the seed value from a second parameter candidate value set; and
   outputting a second output value using the extracted second parameter candidate values,
   wherein the second output value is capable of being generated using the first output value,
   wherein the first parameter candidate value set includes a plurality of first parameter candidate values, and the second parameter candidate value set includes a plurality of second parameter candidate values,
   wherein the seed value is formed by an arbitrary bit string, the extracting of the first parameter candidate values comprises extracting one or more first parameter candidate values corresponding to the bit string, and the extracting of the second parameter candidate values comprises extracting one or more second parameter candidate values corresponding to the bit string;
   wherein the extracting of the first parameter candidate values comprises extracting the one or more first parameter candidate values on the basis of a bit value of each bit included in the bit string and a position of each bit in the bit string and the extracting of the second parameter candidate values comprises extracting the one or more second parameter candidate values on the basis of a bit value of each bit included in the bit string and the position of each bit in the bit string.

7. The method of claim 6, wherein the second output value has a value equal to a value obtained through an operation using the first output value as an exponent or a multiplier.

8. The method of claim 6, wherein the second parameter candidate value set includes the plurality of second parameter candidate values equal to values obtained through an operation using each of the first parameter candidate values included in the first parameter candidate value set as an exponent or a multiplier.

9. The method of claim 6, wherein the extracted second parameter candidate values have values equal to values obtained through an operation using each of the extracted first parameter candidate values as an exponent or a multiplier.

10. The method of claim 6, further comprising performing at least one of digital signature generation, encryption, and encryption key generation using the first output value and the second output value.

* * * * *